United States Patent
Fujino et al.

(10) Patent No.: US 7,804,618 B2
(45) Date of Patent: Sep. 28, 2010

(54) IMAGE FORMING APPARATUS HAVING REMOVABLE EXTERNAL MEMORY AND ITS CONTROL METHOD

(75) Inventors: Toru Fujino, Kawaguchi (JP); Fumio Shoji, Komae (JP); Takao Ikuno, Yokohama (JP); Masahiro Odaira, Kawasaki (JP); Yoshiaki Katahira, Yokohama (JP); Kenji Kasuya, Yokohama (JP); Noritsugu Okayama, Kawasaki (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 11/572,012

(22) PCT Filed: Jul. 13, 2005

(86) PCT No.: PCT/JP2005/013343

§ 371 (c)(1),
(2), (4) Date: Apr. 18, 2007

(87) PCT Pub. No.: WO2006/006733

PCT Pub. Date: Jan. 19, 2006

(65) Prior Publication Data

US 2007/0268531 A1 Nov. 22, 2007

(30) Foreign Application Priority Data

Jul. 15, 2004 (JP) .............................. 2004-208896

(51) Int. Cl.
*G06K 15/00* (2006.01)
*G06F 3/12* (2006.01)

(52) U.S. Cl. ..................... 358/1.16; 358/1.15
(58) Field of Classification Search ................. 358/1.15, 358/1.16
See application file for complete search history.

(56) References Cited

U.S. PATENT DOCUMENTS

| 7,489,417 | B2 * | 2/2009 | Tran et al. ................... 358/1.16 |
| 2003/0236933 | A1 | 12/2003 | Shigeta et al. ................ 710/72 |
| 2005/0141026 | A1 | 6/2005 | Fujino ....................... 358/1.15 |

FOREIGN PATENT DOCUMENTS

CN 1469251 A 1/2004

(Continued)

OTHER PUBLICATIONS

Prieur, Mark, "i925X, i915P/G, LGA775, 3.6Ghz, DDR2 and PCI Express—BeHardware", Jun. 19, 2004, BeHardware, p. 8 of 19, http://www.behardware.com/art/lire/500.*

*Primary Examiner*—Twyler L Haskins
*Assistant Examiner*—Fred Guillermety
(74) *Attorney, Agent, or Firm*—Fitzpatrick, Cella, Harper & Scinto

(57) ABSTRACT

Memory interface means which can be easily removed by a user is included, use of a generally-available general-purpose memory is made possible and increase of the capacity of a memory which can be used by an image forming apparatus, image electronic data stored in a memory in the image forming apparatus, management information for managing the image electronic data, management information in the apparatus such as a telephone book used by facsimile means are can be bidirectionally copied or moved with the external memory in accordance with the user's operation or automatically.

6 Claims, 3 Drawing Sheets

FOREIGN PATENT DOCUMENTS

| | | |
|---|---|---|
| EP | 1376360 A2 | 1/2004 |
| JP | 8-265488 A | 10/1996 |
| JP | 11-1049 | 1/1999 |
| JP | 2001-249741 | 9/2001 |
| JP | 2001-326719 A | 11/2001 |
| JP | 2003-32430 A | 1/2003 |
| JP | 2003-182165 A | 7/2003 |
| JP | 2004-070377 A | 3/2004 |
| JP | 2004-96511 A | 3/2004 |
| JP | 2004-139512 | 5/2004 |

* cited by examiner

IMAGE FORMING APPARATUS HAVING REMOVABLE EXTERNAL MEMORY AND ITS CONTROL METHOD

CROSS REFERENCE TO RELATED APPLICATIONS

This application is a national-stage application under 35 U.S.C. 371 of International Application No. PCT/JP2005/013343 filed Jul. 13, 2005, which claims benefit of priority of Japanese Application No. 2004-208896 filed Jul. 15, 2004; the entire disclosures of the International Application and the Japanese Application are incorporated by reference herein.

TECHNICAL FIELD

The present invention relates to copying machine, facsimile machine, printer, scanner and multifunction peripheral of them respectively provided with removable memory means.

BACKGROUND ART

In the case of a conventional multifunction peripheral multifunction printer (MFP), a memory is fixed to an apparatus and it cannot be removed. Moreover, in the case of a conventional printer, it is possible to expand memories exclusively prepared for the machine in order to improve the printing capacity of the apparatus but the memories are used without being routinely set or removed.

Moreover, the conventional multifunction peripheral (MFP) is provided with a slot for an external memory, which is present as a printer or multifunction peripheral capable of performing printing without using a PC by directly inserting an external memory storing image data photographed by a digital camera. The image data is flown in one direction, that is, from the external memory into the multifunction peripheral, but it is not used without moving the data in the machine to the external memory.

An apparatus is known which stores a facsimile transmitting image or facsimile received image in an external memory (e.g. Japanese Patent Application Laid-Open No. 2004-96511).

Moreover, a printer is known which uses an external memory as a work area when printing an image (e.g. Japanese Patent Application Laid-Open No. 2003-182165).

Furthermore, an apparatus is known which stores the information set to the apparatus in a memory of an externally-connected jig (e.g. Japanese Patent Application Laid-Open No. H08-265488).

DISCLOSURE OF THE INVENTION

In the case of the above image forming apparatus in which memories cannot be expanded, it is impossible to improve the product performance such as printing performance, accumulated number of facsimile transmitting image sheets or the stored number of received image sheets after purchasing a product. Moreover, when setting a lot of memories from the beginning, a problem occurs that the whole product cost is increased.

In the case of an apparatus in which the above exclusive memory can be expanded, the memory is an exclusive product and its price is previously decided even if a general memory price lowers. Therefore, there is a problem that a benefit of memory price lowering cannot be obtained.

An apparatus in which the above general-purpose external memory can be set, only purposes printing of the image data stored in an external memory. Therefore, it is impossible to rewrite the information in the memory of the apparatus to the external memory. Therefore, there is a problem that when the apparatus is broken down and printing cannot be made while receiving important image data, an image is lost when the apparatus is repaired.

It is an object of the present invention to provide an image forming apparatus for making it possible to decrease the whole product cost compared to the case of setting from the beginning a lot of memories to an image forming apparatus in which memories cannot be expanded, or an image forming apparatus capable of setting a general-purpose external memory and capable of rewriting the information on the memory set in the image forming apparatus to the external memory. For example, it is an object of the present invention to provide an image forming apparatus in which an image is not erased while repairing the apparatus even when printing cannot be made owing to breakdown of the apparatus while important image data is received, and also provide its control method.

BEST MODE FOR CARRYING OUT THE INVENTION

The following embodiment is the best mode for carrying out the present invention.

Embodiment 1

Figure 1:
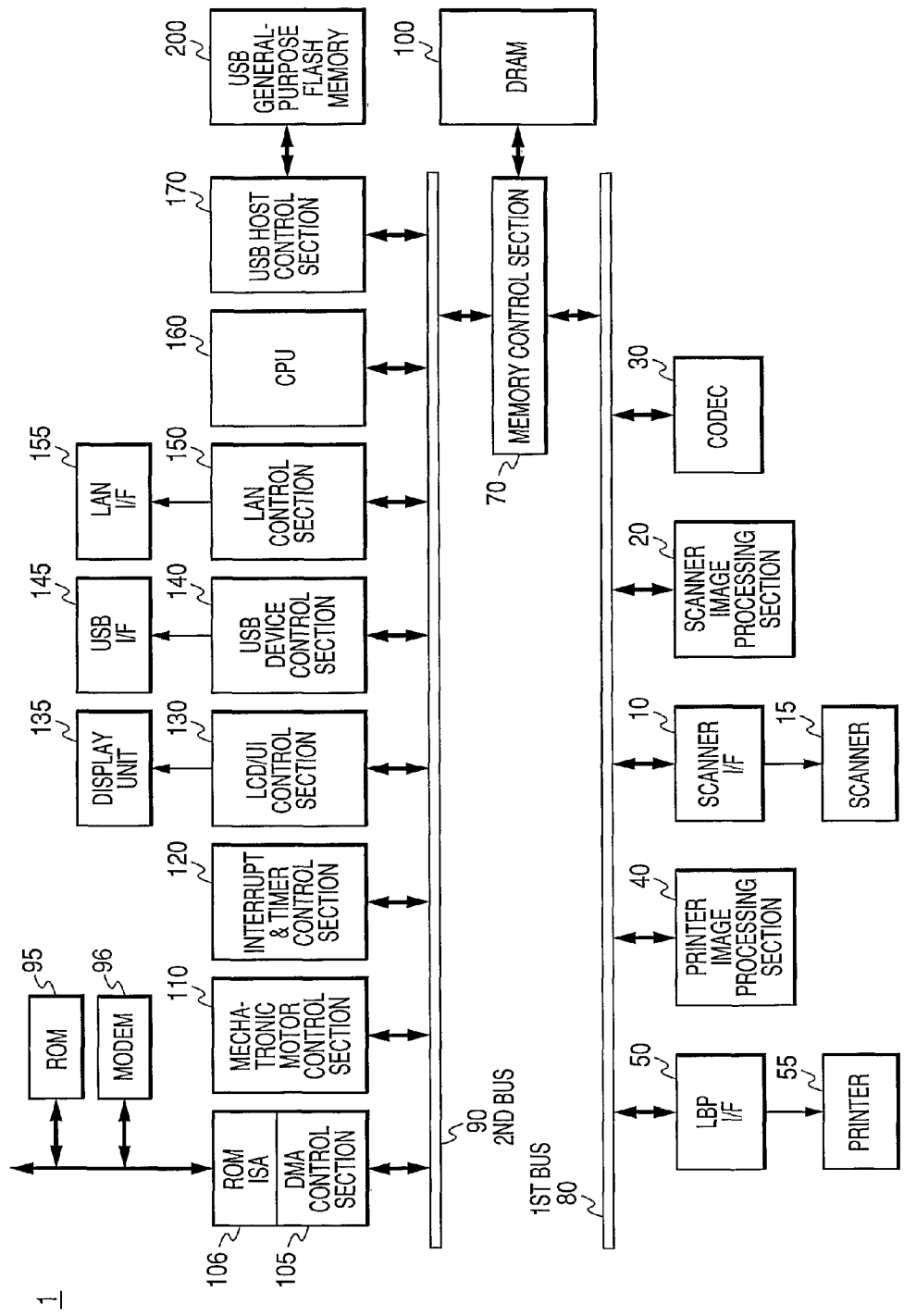
FIG. 1 is a block diagram showing an image forming apparatus 1 of Embodiment 1 of the present invention.

FIG. 1 is a block diagram showing an image forming apparatus 1 which is Embodiment 1 of the present invention.

The image forming apparatus 1 has a scanner interface section 10, scanner 15, scanner image processing section 20, CODEC 30, printer image processing section 40, LBPIF 50, printer 55, memory control section 70, image-processing-system first BUS 80, computer-system second BUS 90, ROM 95, modem 96, DRAM 100, DMA control section 105, ROMISA 106, mechatronic motor control section 110, interrupt and timer control section 120, LCD and user interface control section (LCD/UI control section) 130, display section 135, USB Device control section 140, USBI/F 145, LAN control section 150, LAN I/F 155, CPU 160, USB Host control section 170 and USB general-purpose flash memory 200.

A scanner 15 such as a CCD or CIS is connected to the scanner interface section (scanner IF section) 10 to capture the read data.

The scanner image processing section 20 is a processing section for executing image processing corresponding to an image processing mode (color copying, monochromatic copying, color scanning or monochromatic scanning) for the image data developed in the main memory DRAM 100 by processing the scanner IF section 10.

The printer image processing section 40 is a processing unit for outputting the image data stored in the DRAM 100 to a printer, which outputs a result of the image processing to the printer 55 through the LBPIF 50.

The CODEC 30 is a processing section including a JPEG module and a JBIG module to execute compression and expansion of image data conforming to a predetermined specification.

The memory control section 70 connects the image-processing-system first BUS 80 and computer-system second BUS 90 and performs DMA control for writing or reading data in or from the main memory (SDRAM) 100.

The DMA control section 105 generates and sets a predetermined address for DMA control for exchanging data between each of image processing sections 10, 20, 30, 40 and 50 and the main memory 100 in collaboration with the memory control section 70. Moreover, the DMA control section 105 connects with the ROM 95 through the ROMISA 106 and develops the control program of the image forming apparatus 1 in the memory 100 so that the CPU 160 operates at a high speed.

The CPU 160 controls operations of all blocks and the whole of the image forming apparatus 1 in accordance with a program stored in the ROM 95 and developed in the RAM 100.

The image-processing-system first BUS 80 is an image-processing-system first BUS capable of transferring data among processing sections 10 to 50 of the image processing system. The computer-system second BUS 90 is a computer-system second BUS connecting with the CPU 160, an LCD/user interface control section 130, the mechatronic motor control section 110 and the DMA control section 105.

A mechatronic system is controlled by the mechatronic motor control section 110 and the interrupt and timer control section 120 for taking in charge of timing control for controlling the driving timing of a motor and sync of the processing of an image processing system.

The LCD/UI control section 130 is a unit for receiving various settings and processing states of the image forming apparatus 1 from a display section 135 including key inputs and taking in charge of display control.

The LAN control section 150 is a unit for controlling transmission and reception of data to and from a network connected through a LAN I/F.

The USB Device control section 140 connects with an external unit such as a PC through the USB I/F 145 and controls transmission and reception of data.

The USB Host control section 170 is a USB interface section for making connection with a peripheral unit possible, which shows a state in which the USB general-purpose flash memory 200 which is a feature of the Embodiment 1.

Then, the operation is described in which a program stored in the ROM 95 and having a plurality of functions is executed by the CPU 160.

When using a facsimile transmission function, the image data read by the scanner 15 is temporarily held by the DRAM 100 and then, properly processed by each of the above blocks and stored in the DRAM 100 again. Thereafter, a predetermined procedure is executed by a facsimile control program and the data read from the DRAM 100 is transmitted via the modem 96 while properly converting the data in accordance with the capability of a receiver. When read of an original is completed, read for the next transmission, that is, reservation of the transmission can be made and the number of sheets whose transmission can be reserved and the number of originals are changed by the capacity (memory A) of the DRAM 100.

When a facsimile receiving function is operated, the facsimile data received by the facsimile control program via the modem 96 is properly demodulated and re-encoded by the above blocks and then stored in the DRAM 100. When a printer control program detects that an image which can be printed is stored in the DRAM 100, it confirms that a trouble does not occur in the printer 55 and starts printing. In this case, when the program detects breakdown, no sheet or no toner of the printer, it stops printing and an image is held by the DRAM 100. Even when printing is not completed, the next reception is possible and the number of cases and the number of sheets which can be received are changed by the capacity (memory B) of the DRAM 100.

When a printer function is operated, the print data received from an application (print driver) operated on a PC via the USB I/F 145 or LAN I/F 155 is temporarily stored in the DRAM 100, and control data constituting print data and so on are interpreted by a printer function control program, then the control data is converted into a data format which can be printed by a printer and stored in the DRAM 100 again. The number of cases and the number of sheets which can be continuously accepted are changed in accordance with the capacity (memory C) of the DRAM 100. As the capacity increases, it is possible to accept more cases and sheets at a higher speed.

When a scanner function is operated, a scanner control program stores images read from an application (scan driver) working on a PC in accordance with an instruction received via the USB I/F 145 or LAN I/F 155 in the DRAM 100 (memory D) and successively transmits stores the images. As the capacity increases, it is possible to continuously read a plurality of originals at a higher speed.

Figure 2:
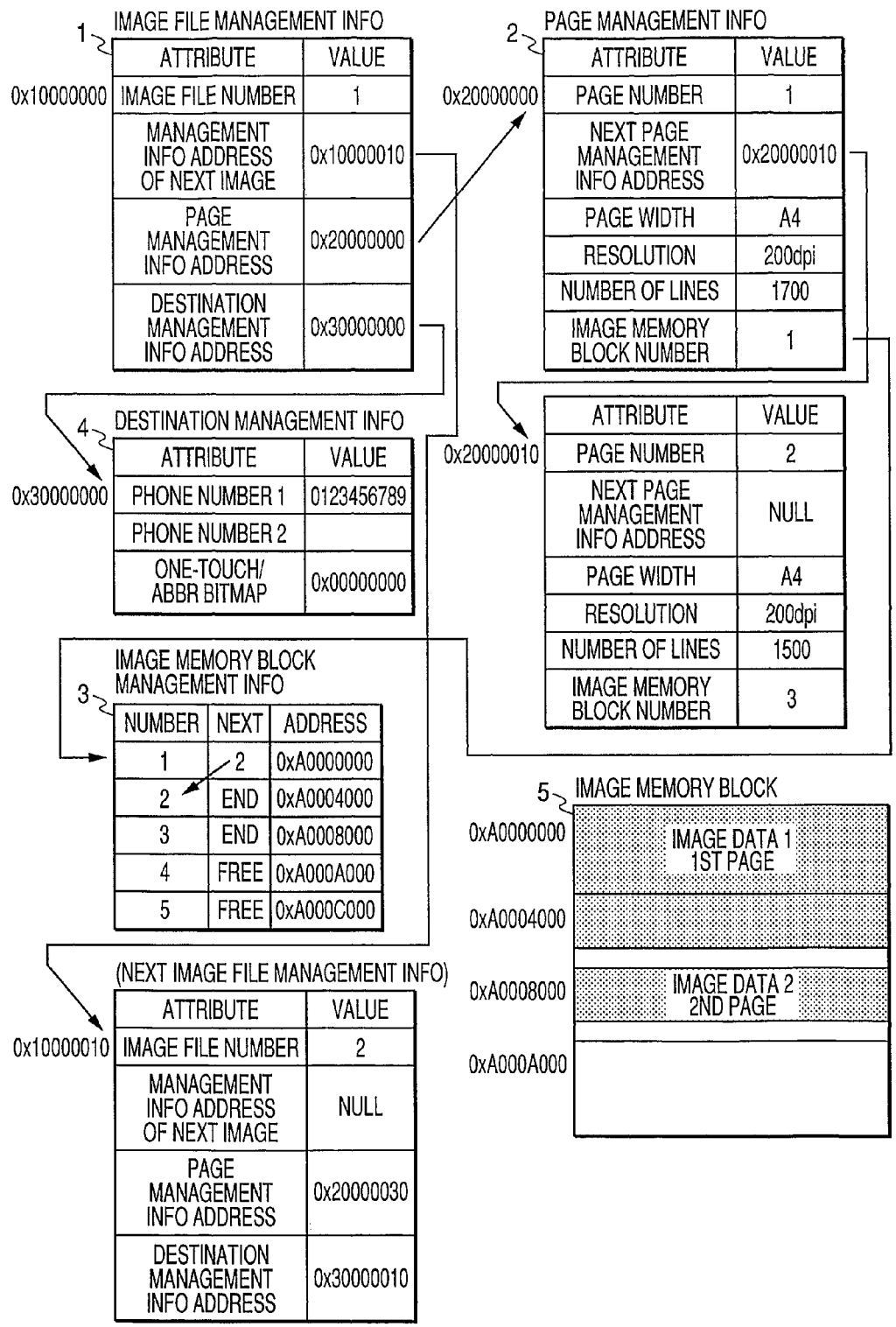
FIG. 2 is an illustration of management information in memory in the Embodiment 1.

FIG. 2 is an illustration of management information in a memory in the Embodiment 1.

Images reading an original and images received through fax are all managed by image file management information 1, page management information 2 and image memory block management information 3 and these management information and image data are arranged on the image memory (DRAM 100). As attributes of the image file management information, there are an image file number, address of the next image file management information, page management information address and destination management information address.

The page management information is generated for each page constituting an image file and has attributes such as a page number, next page management information address, page width, resolution, number of lines, block number of an image memory.

The block number of an image memory can obtain an address in which an actual image is stored by referring to the image memory block management information. Destination management information 4 is information on a destination for facsimile transmission, which is related for each image file in the case of a facsimile transmission image.

In the above description, the image memory block management information is management information for facsimile transmission (memory A). It is allowed to use the image memory block management information as image memory block management information for the memory B, memory C and memory D.

Then, an operating method of a USB general-purpose memory (hereafter referred to as "external memory") in the image forming apparatus 1 which is the Embodiment 1 is described below.

Figure 3:
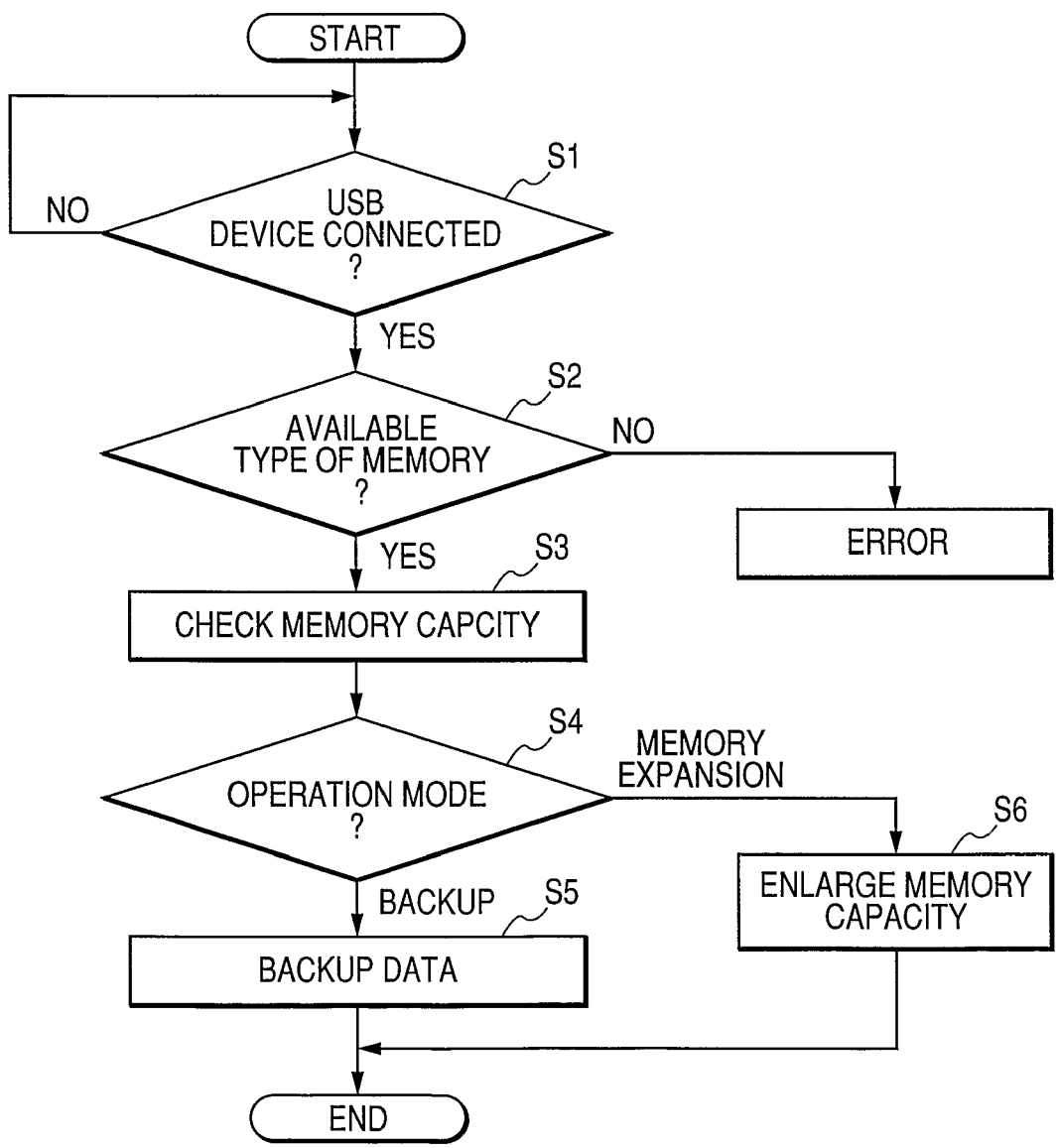
FIG. 3 is a flowchart for explaining an operating method of a USB general-purpose memory in the Embodiment 1.

FIG. 3 is a flowchart for explaining the operating method of the external memory in the Embodiment 1.

When an external memory (USB general-purpose memory, second memory means) is connected to USB connector (S1), a USB Host control program checks the device information of a USB unit and confirms that the information shows a memory of type which can be used in the above embodiment (S2). When the memory can be used, the capacity is confirmed (S3) and the external memory information held by the DRAM 100 is rewritten in accordance with the following operation modes (1) and (2) (S4) previously entered in the apparatus so that each operation program can be used.

Operation Mode (1): Backup Mode (S5)

The data on the DRAM 100 including each management information and image data for the above image is backed up and a write-back (restoring) function is added.

Backup is executed in accordance with a request from a user through a user interface or automatically executed at a time interval previously entered in an apparatus.

To write back the backed-up data, an instruction is received through the user interface and confirmed and then, the content of a USB memory is written back to the SRAM 100.

Operation Mode (2): Memory Extension Mode (S6)

By increasing the upper limit of the image memory block management information for the memory D from the memory A as described for the above program operation, the memory capacity to be managed is increased.

In the case of the image forming apparatus 1, it is also allowed to divide an area to be used in accordance with the capacity of an external memory instead of deciding the only one of the above operation modes and operate the above operation modes in parallel.

According to the above embodiment, the memory of the apparatus can be easily expanded by using memory interface means which can be removed by a user and making it possible to use a generally-available general-purpose memory.

Moreover, according to the above embodiment, when using the connected external memory as an expandable memory in accordance with the operation mode entered in the image forming apparatus, it is used to increase the number of facsimile transmission reservation cases, accelerate a printer function and improve the performance of the apparatus. When using the external memory as backup, the management information in the apparatus such as image electronic data stored in a memory in the apparatus, management information for managing the image electronic data and telephone book used by facsimile means is used for bidirectional copying or moving into and from the general-purpose memory means in accordance with the user's operation or automatically. Therefore, important data is not erased even during replacement of image forming apparatuses.

The above image forming apparatus is at least one of a copying machine, facsimile machine, printer, scanner and multifunction peripheral of them.

That is, the above embodiment is directed to an image forming apparatus having read means for converting the image data reading an original into electronic data, first memory means for storing the electronic data, facsimile means for transmitting the electronic data by using a public line or storing image data received from the public line in the first memory means, external interface means connecting with a predetermined external unit to receive image data to be printed, store the image data in the first memory means or transmit the data stored in the first memory means to an external unit, printing means for printing the electronic data stored in the first memory means, connecting means in which second memory means can be removed by a user, and control means for storing and reading at least one of the image electronic data, management information for managing the image electronic data and telephone book used by the facsimile means stored in the first memory means in and from the second memory means, when the second memory means is connected.

In this case, the control means is means for using the second memory means as an expansion area of the first memory means, and used to improve performances of an image forming apparatus such as the accumulated number of sheets in a memory and operation speeds of scan and a printer. Moreover, the control means is means for changing the above operating methods in the second memory means or means for using the above operating methods in parallel.

Furthermore, the control means is means using a memory management program to be operated in parallel with a program for realizing a function of the image forming apparatus when the recording speed to the second memory means is different from the recording speed to the first memory means, wherein the program for realizing a function uses only the first memory means, and after a predetermined time passes, the memory management program automatically stores the data stored in the first memory means in the second memory means.

Furthermore, the control means is means for automatically storing and reading the image electronic data and management information in accordance with the user's operation between the first memory means and second memory means.

This application claims priority from Japanese Patent Application No. 2004-208896 filed on Jul. 15, 2004, which is hereby incorporated by reference herein.

The invention claimed is:

1. An image forming apparatus comprising:
reading means for converting image data, which is read from an original, into electronic data;
first memory means for storing the electronic data;
facsimile means for transmitting the electronic data by using a public line or storing image data received from the public line in the first memory means;
external interface means for connecting with a predetermined external unit to receive image data to be printed, storing data in the first memory means, transmitting data stored in the first memory means to an external unit, or a combination thereof;
printing means for printing the electronic data stored in the first memory means;
connecting means from which second memory means can be removed by a user;
setting means arranged to enable a backup mode or a memory extension mode to be previously set as an operating mode of the secondary memory means connected to the connecting means; and
control means for, when the second memory means is connected, (1) if the backup mode is set by the setting means, storing in and reading from the second memory means at least one of the electronic data, management information for managing image electronic data, and a telephone book used by the facsimile means, which are stored in the first memory means, and (2) if the memory extension mode is set by the setting means, using the second memory means as an extension area of the first memory means and increasing an upper limit of an image memory management information of the management information to thereby expand a memory capacity of the first memory means,
wherein the control means causes the second memory means to be used as an expansion area of the first memory means and to be used for improving performance of the image forming apparatus by increasing a total number of sheets that can be stored in memory and increasing operation speeds of a scanner and a printer, and wherein the control means causes a memory management program to operate in parallel with a program for realizing a function of the image forming apparatus when a recording speed to the second memory means is different from a recording speed to the first memory means, and wherein the program for realizing the function uses only the first memory means and, after a predetermined amount of time passes, the memory management program automatically stores data that is stored in the first memory means in the second memory means.

2. The image forming apparatus according to claim 1, wherein the control means functions to change an operating mode of the second memory means and to use plural operating modes in parallel.

3. The image forming apparatus according to any one of claims 1 or 2, wherein the image forming apparatus is at least one of a copying machine, a facsimile machine, a printer, a scanner, and a multifunction peripheral.

4. The image forming apparatus according to claim 1, wherein the control means automatically stores and reads the electronic data and the management information, in accordance with a user's operation, between the first memory means and the second memory means.

5. An image forming apparatus control method comprising:

a reading step of converting image data, which is read from an original, into electronic data;

a memory step of storing the electronic data in a first memory;

a facsimile step of transmitting the electronic data using a public line and storing image data received from the public line in the first memory;

an external interface step of connecting with a predetermined external unit to receive image data to be printed, storing data in the first memory, transmitting data stored in the first memory to an external unit, or a combination thereof;

a printing step of printing the electronic data stored in the first memory;

a connecting step of connecting a second memory removable by a user;

a setting step of previously setting a backup mode or a memory extension mode as an operation mode of the second memory connected in the connecting step; and a control step of, when the second memory is connected, (1) if the backup mode is set in the setting step, storing in or reading from the second memory at least one of the electronic data, management information for managing the electronic data, and telephone book used in the facsimile step, which are stored in the first memory, and (2) if the memory extension mode is set in the setting step, using the second memory as an extension area of the first memory and increasing an upper limit of an image memory management information of the management information to thereby expand a memory capacity of the first memory, wherein the second memory is used in the control step as an expansion area of the first memory, and the second memory is used for improving performance of the image forming apparatus by increasing a total number of sheets that can be stored in memory and increasing operation speeds of a scanner and a printer, and wherein a memory management program is operated in the control step in parallel with a program for realizing a function of the image forming apparatus when a recording speed to the second memory is different from a recording speed to the first memory, and wherein the program for realizing the function uses only the first memory and, after a predetermined amount of time passes, the memory management program automatically stores data that is stored in the first memory in the second memory.

6. The image forming apparatus according to claim 1, wherein the connecting means is a USB interface.

* * * * *